United States Patent Office 3,407,229
Patented Oct. 22, 1968

3,407,229
PHENYLCARBAMOYLETHYLTHIOPSEUDOUREAS
Bernard M. Regan, Chicago, Ill., assignor to Baxter Laboratories, Inc., Morton Grove, Ill., a corporation of Delaware
No Drawing. Continuation-in-part of abandoned application Ser. No. 395,286, Sept. 9, 1964. This application May 19, 1967, Ser. No. 639,609
9 Claims. (Cl. 260—557)

ABSTRACT OF THE DISCLOSURE

Compounds of the class phenylcarbamoylethylthiopseudoureas represented by the structure,

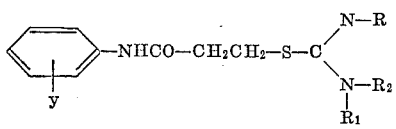

wherein y is hydrogen, methyl, or trifluoromethyl; R, $R_1$, and $R_2$ are hydrogen, lower alkyl or cyclohexyl; and at least one of R, $R_1$, and $R_2$ are other than hydrogen; and the pharmaceutically acceptable acid salts thereof, useful as local anesthetics, for example, 2(2′-phenylcarbamoylethylthio)-1-cyclohexylpseudourea hydrochloride.

This is a continuation-in-part of co-pending application Ser. No. 395,286, filed Sept. 9, 1964, now abandoned.

The present invention relates to novel thiopseudoureas and to the method by which they are prepared. More particularly, it relates to the novel phenylcarbamoylethylthiopseudoureas having the general formula

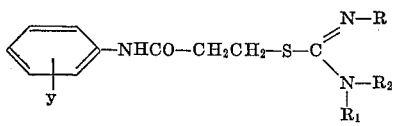

in which y is hydrogen, or a methyl, or a trifluoromethyl substituent; R is hydrogen or lower alkyl (1–4 carbon atoms) or cyclohexyl; $R_1$ and $R_2$ are hydrogen or lower alkyl (1–4 carbon atoms) or cyclohexyl and at least one of R, $R_1$ and $R_2$ are other than hydrogen; and the pharmaceutically acceptable acid salts thereof.

The novel thiopseudoureas of the present invention are more active topically on guinea pig cornea and intradermally in guinea pig wheals and have better margins of safety than the current drug of choice, lidocaine hydrochloride. As such, the thiopseudoureas of this invention hold good promise as effective and useful agents for inducing local anesthesia in man and other animals.

The novel phenylcarbamoylethylthiopseudoureas of the present invention can be conveniently prepared by reacting a phenylcarbamoylethyl halide with an alkylthiourea. In the preferred method of the present invention a mixture of phenylcarbamoylethyl chloride (0.1 mole), an alkylthiourea (0.1 mole) and ethanol (100 ml.) is heated to boiling (ca. 80° C.) and refluxed for about 8 to about 24 hours. The excess solvent is removed by distillation and the residue is usually distributed between water and a water-immiscible solvent, preferably ethyl acetate, to remove by-products. The aqueous portion is then concentrated in vacuo to obtain substantially pure salts of the phenylcarbamoylethylthiopseudoureas. If it is so desired, the compounds can be crystallized from acetone or from ethanol or methanol and ethyl acetate mixtures to further purify them.

The phenylcarbamoylethyl chlorides contemplated for use in the method of the present invention are compounds having the general formula

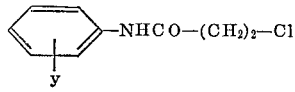

in which y is hydrogen or a methyl or a trifluoromethyl substituent. Especially preferred for use in the method of the present invention are the compounds:

phenylcarbamoylethyl chloride
o-methylphenylcarbamoylethyl chloride
o-trifluoromethylphenylcarbamoylethyl chloride.

The thioureas contemplated for use in preparing the novel compounds of the present invention are those compounds having the general formula

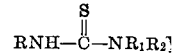

in which R is hydrogen or lower alkyl or cyclohexyl; $R_1$ and $R_2$ are hydrogen or lower alkyl or cyclohexyl and at least one of R, $R_1$ and $R_2$ are other than hydrogen. Illustrative of such thioureas are 1-n-butyl-2-thiourea; 1-cyclohexyl-2-thiourea; 1,1-diethyl-2-thiourea; 1,1-diallyl-2-thiourea; 1,3-diethyl-2-thiourea; 1,3-diisopropyl-2-thiourea and 1-cyclohexyl-3-methyl-2-thiourea.

The novel phenylcarbamoylethylthiopseudoureas of the present invention can be used as local anesthetic agents in the free base form or in the form of pharmaceutically acceptable salts of the free bases. For convenience in administration in aqueous solution, it is preferable to use the salt form of the compounds. The free base form is preferable when it is desired to use the compound in oleaginous pharmaceutical diluents.

The free base form of the phenylcarbamoylethylthiopseudourea can be conveniently prepared by reacting the corresponding salt with an alkaline reagent, for example, sodium carbonate, sodium hydroxide, aqueous ammonia, and other such alkaline reagents commonly used for converting salts to free bases. The free base can be converted, in turn, to the salt form of the compound by reaction with a pharmaceutically acceptable acid, for example, sulfuric, phosphoric, nitric, hydrochloric, hydriodic, hydrobromic, acetic, citric, tartaric, lactic, malic, fumaric, and the like inorganic and organic acids known to be pharmaceutically acceptable.

The practice of the present invention is further illustrated by reference to the following examples in which all "parts" and "percentages" are "parts" and "percentages" by weight unless otherwise indicated.

Example I (a) Phenylcarbamoylethyl chloride (9.2 g., 0.05 mole), 1-cyclohexyl-2-thiourea (7.9 g., 0.05 mole) and ethanol (100 ml.) were refluxed overnight. The reaction mixture was concentrated and crystals formed on cooling. Ethyl acetate was added and the product was collected by filtration and recrystallized from ethanolethyl acetate to give 2(2′ - phenylcarbamoylethylthio) - 1 - cyclohexylpseudourea hydrochloride (I) of M.P. 167–8° C. in 9.9 g. yield (58% of theory).

(b) The above hydrochloride salt of 2(2′-phenylcarbamoylethylthio)-1-cyclohexylpseudourea was converted to the free base form of the compound by reaction with sodium carbonate as follows:

A solution of 1-cyclohexy-2-(2′-phenylcarbamoylethylthio)-pseudourea hydrochloride (1.00 g., 2.92 millimoles) in water (100 ml.) was cooled in an ice-water bath and stirred as a solution of sodium carbonate (0.312 g., 2.92 millimoles) in water (25 ml.) was added dropwise during 30 minutes. The free base precipitated as a white solid which was collected by filtration, washed with water, air dried for two hours, and then dried over potassium hydroxide under vacuum. The dried base (0.7 g., MP., 108–9° C.) was filtered and then cooled under tap water and soon crystallization occurred. The crystalline 1-cyclohexyl-2-(2′-phenylcarbamoylethylthio)-pseudourea was collected and vacuum dried over potassium hydroxide at 65° C.; M.P. 101° C., wt 0.5 g.

*Analysis.*—Calculated for $C_{16}H_{23}N_3OS$: C, 62.92%; H, 7.59%; N, 13.75%; S, 10.49%. Found: C, 63.20%; H, 7.49%; N, 13.65%; S, 10.59%.

Example II

A solution of o-trifluoromethylphenylcarbamoylethyl chloride (12.6 g, 0.05 mole) and 1-cyclohexyl-2-thiourea (7.9 g., 0.05 mole) in ethanol was refluxed overnight and then concentrated to an oily residue which did not crystallize on standing. The oily product was distributed between ethyl acetate and water. The aqueous layer was reextracted with ethyl acetate and with ether. Concentration in vacuo of the water solution gave an amorphous residue which dissolved in acetone and crystallized on standing. The 2[2′(o-trifluoromethylphenylcarbamoyl)-ethyl thio]-1-cyclohexylpseudourea hydrochloride (II) was recrystallized from acetone to give 6.1 g. (30% of theory) M.P. 152–5° C.

Example III

A mixture of o-methylphenylcarbamoylethyl chloride (13.8 g., 0.07 mole), 1-n-butyl-2-thiourea (9.3 g., 0.07 mole) and ethanol (150 ml.) was heated to boiling and refluxed overnight. The reaction product was concentrated to dryness and the amorphous residue distributed between ethyl acetate and water. The aqueous layer was reextracted with ethyl acetate and with ether and then concentrated in vacuo to dryness. The amorphous residue dissolved in hot acetone and crystallized on cooling. The 2[2′(o-methylphenylcarbamoyl)-ethylthio]-1-n-butylpseudourea hydrochloride (III) was recrystallized from acetone which yielded 13.8 g. (60% of theory) of M.P. 101–10° C.

*Analysis.*—Calculated for $C_{15}H_{24}ClN_3OS$: C, 54.61%; H, 7.33%; N, 12.74%. Found: C, 54.60%; H, 7.16%; N, 12.48%.

Example IV

A solution of phenylcarbamoylethyl chloride (9.2 g., 0.05 mole) and 1,1-diallyl-2-thiourea (7.8 g., 0.05 mole) in methanol (50 ml.) was refluxed for eight hours. The reaction mixture was concentrated and the concentrate diluted with acetone and ethyl acetate to effect crystallization. The crystalline product was recrystallized from methanol-ethyl acetate, and 2(2′-phenylcarbamoylethylthio)-3,3-diallyl-pseudourea hydrochloride (IV) of M.P. 137–8° C. was isolated in 7.5 g., yield (44% of theory).

Employing the methods described in the above examples the following compounds were likewise prepared.

2[2′(o-methylphenylcarbamoyl) - ethylthio] - 1-cyclohexylpseudourea hydrochloride (V)

2(2′-phenylcarbamoylethylthio) - 1,3 - diisopropylpseudourea hydrochloride (VI)

2(2′ - phenylcarbamoylethylthio) - 1 - cyclohexyl - 3 - methylpseudourea hydrochloride (VII)

2(2′-phenylcarbamoylethylthio)-3, 3 - diethylpseudourea hydrochloride (VIII)

These eight compounds (I to VIII) were tested for local anesthetic activity on guinea pig cornea using a modified Chance and Lobstein [1] method and intradermally in guinea pig wheals using a modified Bulbring and Wajda [2] method. The lethal doses were measured by intravenous injection in white mice (iv. $LD_{50}$). The activity and toxicity values presented here are relative values referring to lidocaine hydrochloride as a standard, whose activity and toxicity are both by definition, unity. Thus, a compound is characterized by its relative anesthetic activity, RA, its relative toxicity, RT, and the ratio RA/RT, or anesthetic index, AI. These values are given in Table I.

TABLE I

| Compound | $EC_{50}$,[1] mg./ml. | | RA | | $LD_{50}$, mg./kg. w. | RT iv. w. | AI=RA/RT | |
|---|---|---|---|---|---|---|---|---|
| | Corneal | id. | Corneal | id. | | | Corneal | id. |
| Lidocaine. HCL | 7.9 | 0.74 | 1.0 | 1.0 | 32 | 1.0 | 1.0 | 1.0 |
| I | 1.3 | 0.29 | 6.1 | 2.6 | 55 | 0.58 | 10 | 4.5 |
| II | 1.6 | 0.46 | 4.9 | 1.6 | 27 | 1.2 | 4.1 | 1.3 |
| III | 2.0 | 0.49 | 3.9 | 1.5 | 43 | 0.74 | 5.3 | 2.0 |
| IV | 1.8 | 0.39 | 4.4 | 1.9 | 33 | 1.0 | 4.4 | 1.9 |
| V | 1.9 | 0.31 | 4.2 | 2.4 | 38 | 0.84 | 5.0 | 2.9 |
| VI | 1.8 | 0.26 | 4.0 | 2.8 | 20 | 1.6 | 2.5 | 1.7 |
| VII | 1.2 | 0.13 | 6.6 | 5.7 | 25 | 1.3 | 5.1 | 4.4 |
| VIII | 3.8 | 0.62 | 2.1 | 1.2 | 47 | 0.68 | 3.1 | 1.8 |

[1] Effective concentration which anesthetized 50% of the test animals.

As can be seen from the Table, Compounds I–VIII are all more active topically (RA corneal 6.1, 4.9, 3.9, 4.4, 4.2, 4.0, 6.6 and 2.1 respectively) and intradermally (RA id. 2.6, 1.6, 1.5, 1.9, 2.4, 2.8, 5.7 and 1.2 respectively) than lidocaine hydrochloride (RA corneal and id. 1.0). Moreover, Compounds I, III, V and VIII are also less toxic (RT 0.58, 0.74, 0.84 and 0.68 respectively) than lidocaine hydrochloride (RT 1.0) by the intravenous route, while Compound IV is equitoxic (RT 1.0). On the other hand, Compounds II, VI and VII are more toxic (RT 1.2, 1.6 and 1.3) than lidocaine hydrochloride intravenously. However, all eight compounds have superior anesthetic indicies (RA/RT), topically and intradermally, than lidocaine hydrochloride (AI corneal and id. 1.0). The AI corneal values for Compounds I–VIII are 10, 4.1, 5.3, 4.4, 5.0, 2.5, 5.1 and 3.1 respectively and the AI id. values are 4.5, 1.3, 2.0, 1.9, 2.9, 1.7, 4.4 and 1.8 respectively. Consequently, Compounds I–VIII have a greater margin of safety in addition to being more potent than lidocaine hydrochloride. In these respects Compound I is particularly noteworthy.

From the foregoing table it appears that the novel compounds of the present invention more closely approach the ideal local anesthetic agent than any of the compounds previously known. The compounds of the present invention may be readily prepared for pharmaceutical use by combining them with suitable pharmaceutical diluents to form ointments, aerosol sprays, solutions and the like.

While in the above examples specific reagents have been used to serve as solvents and the like, it will be readily understood by those skilled in the art that the scope of the present invention is not limited to the use of such reagents and that trial testing or reference to suitable commercial property tables can be employed to find suitable equivalents to the named solvents.

It will also be readily apparent to those skilled in the art that still other changes can be made without departing from the spirit and scope of the present invention.

---

[1] Chance and Lobstein, J. Pharmacol. and Exper. Therap., 82, 203 (1944).
[2] Bulbring and Wajda, ibid., 85, 78 (1945).

What is claimed is:
1. A compound selected from the group consisting of phenylcarbamoylethylthiopseudoureas having the formula:

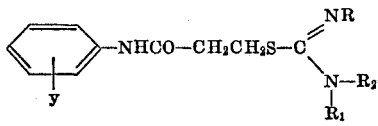

in which $y$ is hydrogen, or a methyl, or a trifluoromethyl substituent; R is hydrogen, lower alkyl (1–4 carbon atoms) or cyclohexyl; $R_1$ and $R_2$ are hydrogen, lower alkyl (1–4 carbon atoms) or cyclohexyl and at least one of R, $R_1$ and $R_2$ are other than hydrogen; and the pharmaceutically acceptable acid salts thereof.

2. The compound of claim 1 in which the phenylcarbamoylethylthiopseudourea is 2(2′-phenylcarbamoylethylthio)-1-cyclohexylpseudourea hydrochloride.

3. The compound of claim 1 in which the phenylcarbamoylethylthiopseudourea is 2[2′(o - trifluoromethylphenylcarbamoyl) - ethylthio]-1-cyclohexylpseudourea hydrochloride.

4. The compound of claim 1 in which the phenylcarbamoylethylthiopseudourea is 2[2′(o - methylphenylcarbamoyl)-ethylthio]-1-n-butylpseudourea hydrochloride.

5. The compound of claim 1 in which the phenylcarbamoylethylthiopseudourea is 2(2′ - phenylcarbamoylethylthio)-3,3-diallylpseudourea hydrochloride.

6. The compound of claim 1 in which the phenylcarbamoylethylthiopseudourea is 2[2′(o - methylphenylcarbamoyl) - ethylthio] - 1 - cyclohexylpseudourea hydrochloride.

7. The compound of claim 1 in which the phenylcarbamoylethylthiopseudourea is 2(2′ - phenylcarbamoylethylthio)-1,3-diisopropylpseudourea hydrochloride.

8. The compound of claim 1 in which the phenylcarbamoylethylthiopseudourea is 2(2′ - phenylcarbamoylethylthio) - 1 - cyclohexyl - 3 - methylpseudourea hydrochloride.

9. The compound of claim 1 in which the phenylcarbamoylethylthiopseudourea is 2(2′ - phenylcarbamoylethylthio) - 3,3 - diethylpseudourea hydrochloride.

References Cited

Bauer et al.: Jour. Org. Chem., vol. 26, pp. 1443–5 (1961).

Weiss et al.: Jour. Amer. Chem. Soc., vol. 72, pp. 1687–9 (1950).

NORMA S. MILESTONE, *Primary Examiner.*

NATALIE TROUSOF, *Assistant Examiner.*